United States Patent [19]

Fischer et al.

[11] 4,258,807

[45] Mar. 31, 1981

[54] METHOD FOR MAKING ROCK BITS

[75] Inventors: John F. Fischer, Los Alamitos; Elton R. Foor, Garden Grove, both of Calif.

[73] Assignee: Smith International, Inc., Newport Beach, Calif.

[21] Appl. No.: 953,556

[22] Filed: Oct. 23, 1978

Related U.S. Application Data

[62] Division of Ser. No. 818,144, Jul. 22, 1977, Pat. No. 4,156,123.

[51] Int. Cl.³ .............................................. E21B 10/50
[52] U.S. Cl. .................................... 175/375; 175/411; 76/108 R
[58] Field of Search .................... 175/374, 375, 411; 76/108 R; 219/137 WM

[56] References Cited

U.S. PATENT DOCUMENTS

| 2,831,661 | 4/1958 | Brown | 175/375 X |
| 2,885,186 | 5/1959 | Hammer | 175/375 X |
| 3,288,981 | 11/1966 | Mabry et al. | 219/137 WM |

OTHER PUBLICATIONS

*Welding Handbook*, pp. 47.39-47.43, 1/1971, 6th ed., vol. 3A.

*Primary Examiner*—James A. Leppink
*Assistant Examiner*—Richard E. Favreau
*Attorney, Agent, or Firm*—Christie, Parker & Hale

[57] ABSTRACT

Segments of a rock bit are secured together by electron beam welding. The segments are slightly spaced apart prior to welding by a thin shim of alloying metal such as titanium which improves ductility of the weld and is a strong carbide-former during welding. The shim is positioned between adjacent segments in the region of the crown or dome of the bit. The resulting welded interface is a fine-grain stress-relieved structure with good ductility and resistance to cracking.

6 Claims, 7 Drawing Figures

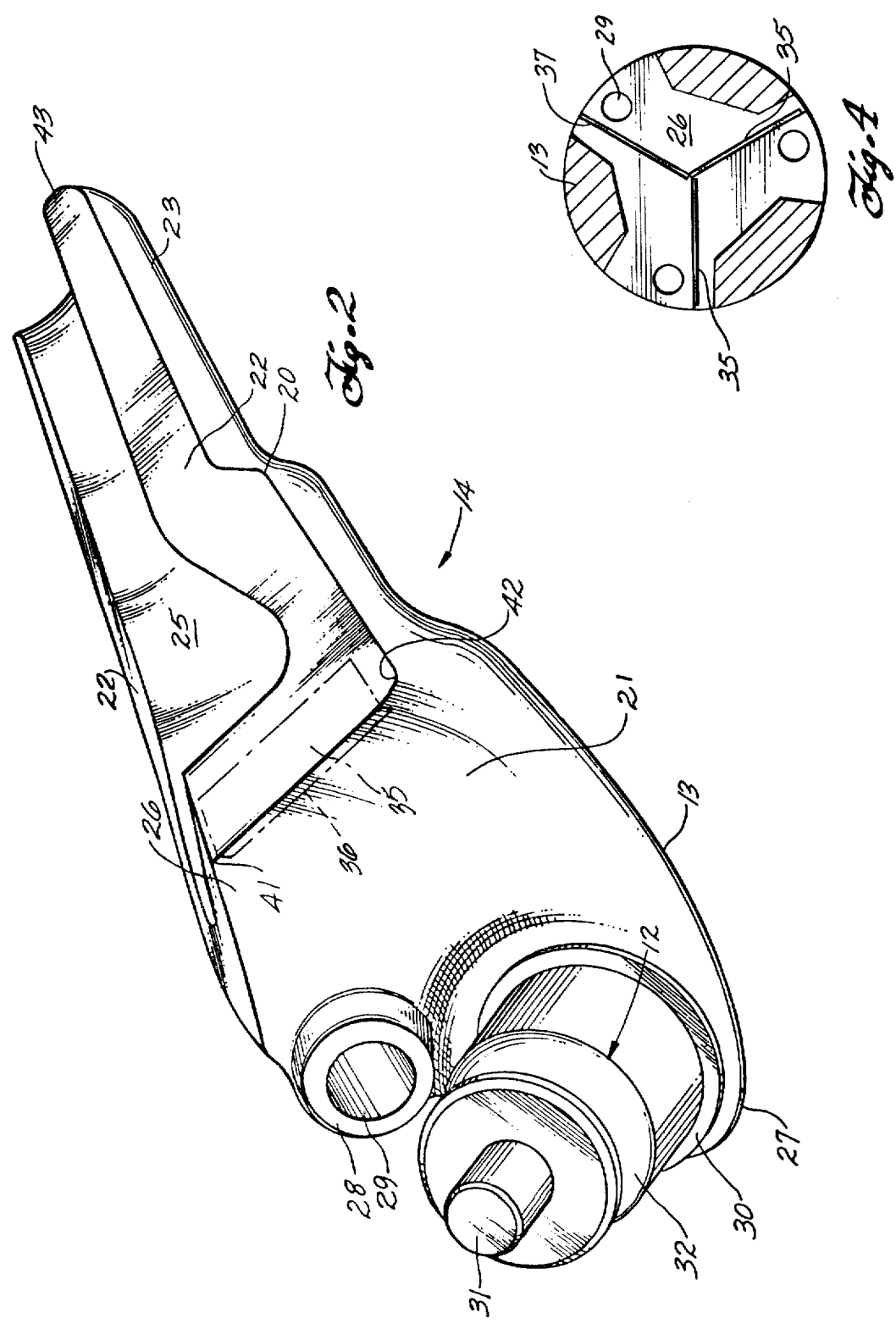

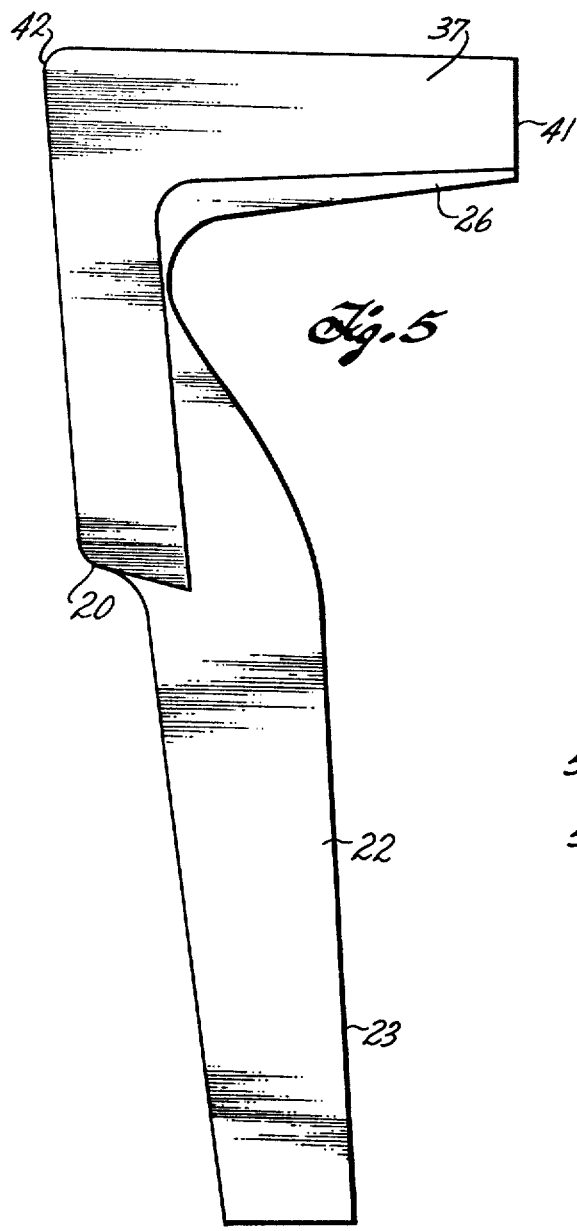
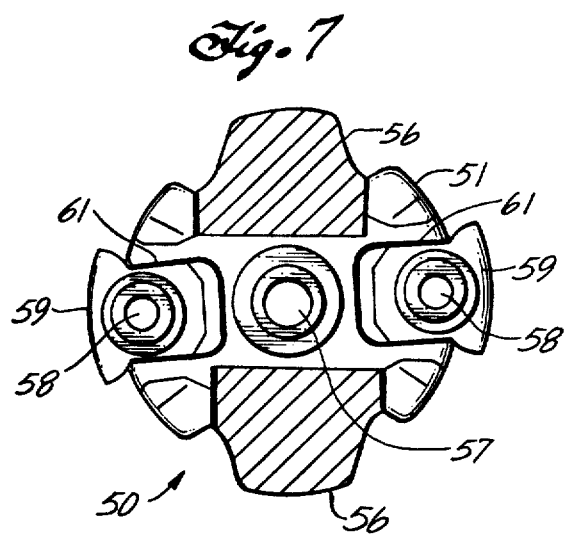
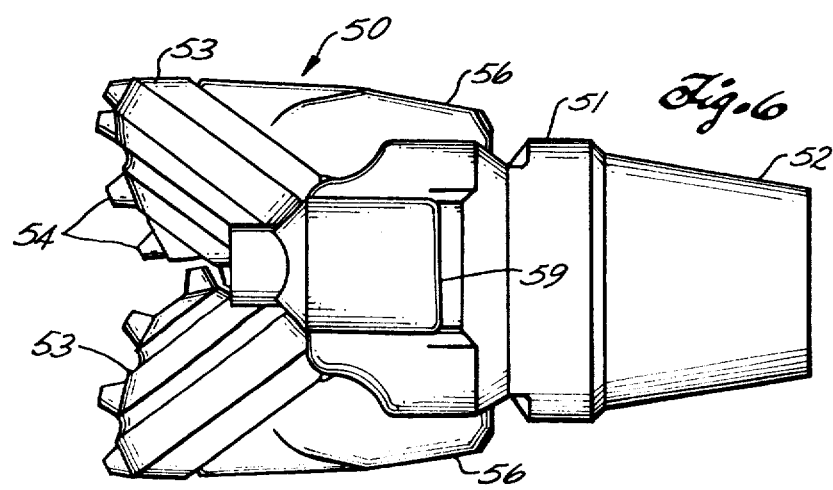

METHOD FOR MAKING ROCK BITS

This ia a division of application Ser. No. 818,144, filed July 22, 1977 now U.S. Pat. No. 4,156,123.

BACKGROUND OF THE INVENTION

Rotary rock bits are used to penetrate earth formations in the drilling of oil and gas wells, geothermal steam wells, and related deep bores of accurately controlled diameter and direction. Typical modern rock bits have a main body with a threaded upper or pin end adapted for attachment to a drill pipe used in conventional rotary drilling. A plurality of conically shaped cutters or "cones" are rotatably mounted on legs extending downwardly from the main body, and the cones have teeth or hard inserts which contact and crush the rock formation being penetrated. Drilling mud is pumped through the drill pipe and passages in the bit body to cool the bit, and to flush cuttings from the bottom of the hole to the surface.

The main body of a typical modern bit is made by welding together several (usually three) mating segments. The lower end of each segment is a depending leg having a bearing pin at its lower end for rotatably supporting a rockboring cutter cone. Each segment usually includes a pressure-compensated lubricant reservoir for supplying grease to the cone bearing.

In a typical three-cone bit, each segment has a pair of flat mating faces or faying surfaces oriented 120 degrees apart, and each face mates with a corresponding face on the adjacent segment. The assembly of three segments forms the main body of the bit, and the flat faces of adjacent segments lie in planes intersecting substantially along the bit axis. The segments are clamped in a holding fixture, checked for "gage" or diametral accuracy, and then welded together along the faying surfaces. Rock bits are subjected to extreme loads during drilling, and the segments must be secured together with a high-strength weld to avoid cracking.

A crack in the body of a rock bit can lead to leakage of drilling fluid from the interior of the bit to the exterior. Rock bits are often operated with abrasive drilling mud at pressures of over 1500 psi in the interior of the bit body. Leakage of drilling mud through a weld crack in the steel bit body can rapidly enlarge the crack to produce severe leakage. Such "wash-out" of the weld can change the flow direction of drilling fluid and degrade performance of the bit. Wear of the cones on the rock bit can be a significant problem if the mud-stream direction is not properly controlled. Pressure loss due to large leakage can result in premature pulling of the drill string with consequent loss of drilling time.

It has been common practice for many years to use arc welding to melt a filler metal into the interfaces between the segments to weld the segments together. This form of welding is expensive and time consuming, and requires a highly skilled operator if consistent results are to be achieved. A weld of this type does not always result in the strength which is desired in the welded assembly. Deep welds can require many passes to add enough filler metal to complete the weld. This method of welding also involves significant heating of the segments which may affect previous heat treatment of the welded parts and cause unpredictable warping of the completed bit outside of desired dimensional tolerances. Damage to resilient seals installed before welding can also be a problem arising from excessive heating.

Energy-beam welding is an alternate technique which has been perfected as a general welding method in recent years. The mating surfaces of the parts to be welded are irradiated with a focused beam of energy which melts the surfaces and forms a welded interface which may extend deeply between the parts in the direction of beam penetration. Laser beams and the like can be used as energy sources, but most commercial welding machines of this type use a high-energy electron beam which is generated in a vacuum chamber in which the parts to be welded are supported. The heat-affected zone lateral to the direction of the beam is shallow (minimizing warping and distortion of the parts), and substantially the entire faying surfaces of rock-bit segments can be welded to form a strong main body for the bit. Such welds are characterized by a depth of penetration much larger than the width of the heat-affected zone.

Use of energy-beam welding in the construction of rock-bit bodies is disclosed in U.S. Pat. Nos. 3,907,191 and 3,987,859 which discuss electron-beam welding methods in greater detail. These patents teach a procedure in which the bit segments are clamped together with mating faces in abutting contact without intervening spacers or shims. The segments are then electron-beam welded along the contacting surfaces of the mating faces.

We have found that a significant improvement in weld integrity and quality arises from placing a thin shim of an alloying metal such as titanium between the mating faces of the segments prior to welding with energy-beam techniques. Preferably, the shim is positioned at the central part of the bit-body dome or crown where the segments converge together, and shim thickness is limited to about 0.010 inch to avoid an excessive gap between the parts which could interfere with formation of a properly welded interface between the segments.

Use of steel shims between the segments of a rock-bit body has been known for many years as a dimensional control for assuring that bits assembled by gas or arc welding would have a correct gage diameter. Such shims were used when measurement showed that the gage diameter was out of tolerance. These shims, however, were isolated from the welded interface and did not affect the metallurgical properties of the weld.

A slurry of titanium powder in acetone has also been tried at one edge of the interface to be electron-beam welded. Such a slurry was applied to the surface of the body adjacent the Y-shaped intersection of the mating faces to be welded after the segments were assembled. The powder was placed on the dome surface and appeared to be scattered during electron-beam welding. It is believed that no more than a surface portion of the weld bead could be affected by the powder. No changes in weld properties were noted. So far as is known, shims of titanium or other alloying metal have not previously been positioned between the surfaces of steel rock-bit segments to be welded. Filler metal foil of aluminum alloy has been described for inhibiting cracking during welding of aluminum, and filler metal wire for electron-beam welding steel is also known for inhibiting cracking. See, for example, pages 530, 535, 536, 555 and 556 of *Welding and Brazing, Metals Handbook*, Vol. 6, 8th Edition, American Society for Metals (1971).

Another advantage of the use of shims is that the resulting opening of a slight gap between the segment faying surfaces in the region of the dome acts as a stressrelieving mechanism for the weld which minimizes residual stresses and the risk of cracking. The metal of the shim acts as a filler in critical regions to avoid depressions at the weld surface.

The shim metal alloys with the metal of the segments in the weld, thereby improving the weld ductility and crack resistance. When titanium or the like is used as the shim metal, it acts as a scavenger and stabilizer which deoxidizes the weld and stabilizes any excess carbon as titanium carbide to avoid embrittlement and cracking. The resulting weld is a fine-grain structure of improved ductility and impact strength, and excessive hardening of the weld during cooling is avoided.

SUMMARY OF THE INVENTION

Briefly stated, this invention relates to an improved method for energy-beam welding of rock bit segments to form a bit body, the segments each having mating faces or faying surfaces configured to be welded to corresponding faces on adjacent segments. A thin shim of an alloying metal is positioned between each pair of adjacent faying surfaces. The segments are clamped together and the faying surfaces are welded using an energy-beam method such as electron-beam welding which enables substantially the entire adjacent surfaces to be welded together. Preferably, the shim is made of titanium for good metallurgical properties, and is limited to about 0.010 inch in thickness to avoid creating an excessive gap between the faying surfaces prior to welding. In a preferred embodiment, three shims are used in the dome region of a three-cone rock bit body to inhibit cracking. Three welds are made in sequence on the body of such a rock bit. The shim in the third weld is generally L-shaped and extends along at least a part of the faying surfaces on the shank as well as in the dome.

DESCRIPTION OF THE DRAWINGS

FIG. 2 is a pictorial view of an individual segment of the rock bit body;

FIG. 4 is a semi-schematic end view of the crown or dome of the bit, showing the segments aligned together and with shims positioned between the faying surfaces in preparation for beam welding;

FIG. 5 is an elevation of one faying surface of the third weld in a three-cone rock bit with an L-shaped shim in place;

FIG. 6 is a side view of a two-cone rock bit; and
FIG. 7 is an end view, partly in section, of the rock bit of FIG. 6.

DESCRIPTION OF THE PREFERRED EMBODIMENT

Figure 1:
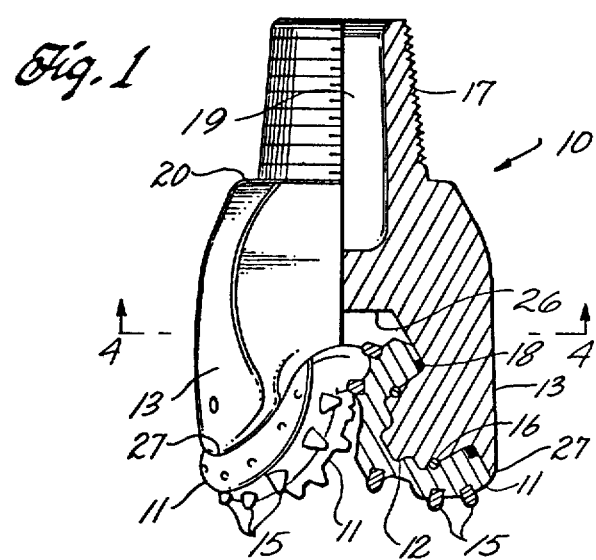
FIG. 1 is an elevation, partly in section, of a complete rock bit.

A typical rock bit 10 of a type suitable for construction according to this invention is shown in FIG. 1. The bit illustrated is a three-cone journal-bearing bit, but it is to be understood that other styles of bits of this general type are suitable for assembly by the techniques described herein. For example, bits with antifriction bearings, or with different numbers of cones, are within the scope of the present invention, and the particular style shown in FIG. 1 is simply by way of example.

Bit 10 includes three cone-shaped cutters 11 mounted on journal-bearing pins 12 integrally formed at the lower end portions of legs 13 depending from three bit segments 14 which comprise the main body of the bit. Each cutter can have milled teeth (not shown), or can carry a plurality of sintered tungsten carbide inserts 15 suitable for drilling hard formations. The cutter cones are retained on journal pins 12 by conventional locking balls 16 which are fed into a ball-bearing race through a ball passage (not shown) after the cutters are mounted as is well known in the art.

A pin end 17 at the upper end of the bit body remote from cutters 11 is threaded for attachment to a drill collar (not shown) at the lower end of a drill string made up of pieces of drill pipe. The drill collar seats on a shoulder 20 on the exterior of the bit body. The pin or shank end of the rock bit is generally cylindrical although the threaded portion is often conical, and is sometimes referred to as the tool joint. Each cutter and associated segment may also be provided with a conventional lubrication system which is omitted from the drawings for clarity. The lubrication system supplies grease to the bearing surfaces, and grease seals 18 are typically provided between the cutters and segment legs to prevent loss of lubricant.

A central interior portion 19 at the upper end of the bit is hollow and communicates with passages (not shown in FIG. 1) in the bit legs leading to openings or jet orifices adjacent the cutter cones. Drilling mud is pumped from the surface through the drill pipe to flow through these openings adjacent the cutters, and to carry rock particles back to the surface through the annulus around the bit and drill-pipe string.

In the center portion of the bit body between the shank end and the cone-supporting lower ends of the legs is a web 26 of steel separating the interior of the hollow shank end from a bit-body dome or crown undersurface which extends over the cones. The features described thus far are conventional and well known in the art, and, for brevity, will not be discussed in greater detail.

Referring to FIG. 2, each segment 14 has a pair of angularly oriented flat faces or faying surfaces 22 which extend longitudinally along a shank portion 23 of the segment. The mating or faying surfaces 22 are normally oriented at an angle of 120° to each other so the three segments commonly used to form a complete bit body will fit together tightly when assembled for final welding. The three segments used in a typical three-cone bit are substantially identical and the planes of the faying surfaces intersect generally along the bit axis.

An inner surface 25 of the segment shank portion is concave to form a 120° segment of central interior portion 19 of the bit body. The concave crown or dome surface on the underside of web 26 extends downwardly and outwardly from the lower end of mating surfaces 22 to a tapered and curved lower end of the segment leg called a shirttail 27. The steeply inclined portion of the crown or dome surface leading to the cone-supporting lower end portion of the leg is conventionally called a throat surface 21. A flat leg backface 30 (FIG. 2) is positioned at the base of pin 12.

A boss 28 having an opening 29 therethrough is formed at one side of the crown surface to receive a tungsten-carbide nozzle (not shown) for passage of drilling mud pumped through central interior portion 19 (FIG. 1) of the bit body during use of the bit. Bearing pin 12 extends inwardly and downwardly from leg backface 30, and includes conventional features such as a spindle or nose bearing 31 and an annular ball-race groove 32 to receive retaining balls 16.

Before assembling the bit body, a cutter cone is mounted on the bearing pin 12 of each segment leg. Ball passages and lubricant ports, if any, are plugged to prevent intrusion of unwanted materials. Such subassemblies of segment and cone are conventional, and three such subassemblies are used to form a complete three-cone bit body.

To assemble the bit, the several segment subassemblies are positioned together in a conventional clamping jig (not shown) with each faying surface 22 in face-to-face alignment with a corresponding faying surface on the adjacent segment. Typical clamping jigs and assembly fixtures suitable for use with electron-beam welding are shown in the aforementioned U.S. Pat. No. 3,907,191 and No. 3,987,859, the disclosures of which are herein incorporated by this reference.

Figure 3:
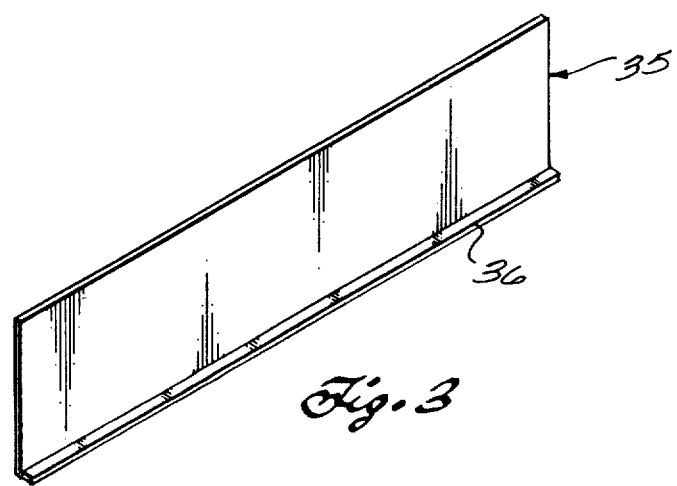
FIG. 3 is a perspective view of a shim for an assembly of segments.

FIG. 4 shows schematically the undersurface of the bit body crown or dome with the three bit segments positioned together prior to welding. Legs 13 are shown in cross section. Before the segments are clamped together, a shim 35 of the type shown in FIG. 3 is inserted between two of the three pairs of mating faces in the position shown in phantom line in FIG. 2. Each shim is configured to fit against the lower, roughly rectangular part of the mating face of the bit segment in web 26 of the bit.

The dimensions of shim 35 will differ according to the size of the bit being manufactured, but the shim typically has a width of about ⅜ inch to 1 inch, and a length of 3 inches or more, to correspond to the dimensions of the welded portion of the segment faying surface adjacent the dome of the bit. Preferably, each shim is bent along one longitudinal edge to form a small perpendicularly extending lip 36. The lip limits the depth of insertion of the shim between the mating faces prior to final clamping of the bit segments, and provides filler metal during welding.

As mentioned hereinafter, two shims 35 are placed in the two welding interfaces which are the first and second to be electron-beam welded. A different shim 37 is used in the third welding interface. FIG. 5 shows one faying surface 22 of the third welding interface with a shim 37 in place. The balance of the structure of the segment is omitted. Third shim 37 has an "L" shape with one arm extending along the faying surface in the dome portion of the bit. This part of L-shaped shim 37 corresponds to straight shims 35 in the first two welding interfaces. The other arm of L-shaped shim 37 extends along the faying surface toward shank portion 23 of the segment. This arm of the L-shaped shim extends to the region of shoulder 20. If desired, two straight shims laid in place like an L can be used in the third welding interface instead of the L-shaped shim illustrated in FIG. 5.

Thin sheet-metal stock is used to make the shims 35 and 37, and shim thickness is preferably limited to about 0.010 inch to avoid an excessive gap in the welding interface between the segments which could interfere with electron-beam welding of the faying surfaces. Sheet materials in the range of about 0.003 to 0.007 inch thickness have been found to be preferable for making the shims.

After the segments have been properly positioned and clamped with the shims 35 and 37 in place in the three interfaces to be welded, the electron-beam welding process can be commenced. One of the three interfaces with a straight shim 35 is indexed to the beam position. The electron beam is then used to make a light tack weld between the legs commencing in center 41 (FIG. 2) of the dome and proceeding outwardly to an outer corner 42 of mated faying surfaces 22 and then along shank portion 23. The direction of traverse of the electron beam is then reversed and power increased to produce a weld of the desired depth, which in most areas is the full width of faying surfaces 22.

The electron beam is also rapidly oscillated to assure melting of steel from both legs as well as melting of the shim. Thus, the full depth weld cycle commences at an end 43 of the shank portion and proceeds along the interface to center 41 of the dome. In the crown or dome region, the electron beam intersects the bit surface at an angle of about 25° from the surface and extends in a direction towards the bit axis. Since the angle of the electron gun is usually fixed, the electron beam intersects the surface of the bit body in the shank portion at a much higher angle. In one embodiment such a weld bead has a depth of about an inch in some areas, a width (lateral to the direction of beam penetration) of about ⅛ inch, and a heat-affected zone about 1/32 inch wide on each side of the weld bead.

When the first weld is completed, the bit is indexed 120° around its axis to bring the next interface into the electron beam position, and the cycle is repeated until all three welds have been made. Straight shims 35 are used in the first two welds and an L-shaped shim 37 is preferably used in the third weld.

After the three welds are made, there are three weld beads which intersect in a Y-shaped intersection in the center of the dome portion of the bit body on the bit axis. The weld beads are 120° apart, and extend radially outwardly from the center of the dome portion and along the shank or pin portion of the bit body. Such a weld bead in the dome portion has a different alloy content than the steel of the segments, and preferably has greater ductility than the segment steel.

When the welds are completed, pin end 17 (FIG. 1) is machined and threaded to provide a tool-joint connection on the shank portion of the bit body for connection to a drill string. Other finishing operations such as installation of mud jets, lubrication of bearings, and installation of pressure compensators are normally completed after welding.

The shims in the dome portion of the bit body serve several purposes in construction of the bit. The metal of the shim provides an alloying metal for the steel in the dome portion of the bit segments for enhancing ductility and crack resistance. Dilution by the metal of the shim can reduce carbon content of the metal in the weld bead. The shim provides space for stress relief of the weld, particularly in the dome portion. The metal of the shim can also combine with carbon or other materials which could adversely affect weld properties. Melting of the extra metal in the shim and in lip 36 of the shim can minimize depressions in the weld metal surface.

A particularly suitable material for the shim is titanium. When titanium alloys with the steel of the bit segments several improvements in metallurgical properties of the weld bead can result. Ferrite in the weld bead can be strengthened by solid solution of titanium. The titanium tends to promote a fine grain structure and deoxidizes the weld bead. Adverse hardening of the weld bead during rapid cooling after passage of the electron beam is inhibited. Impact strength, fatigue resistance, and ductility of the weld bead are enhanced. Hardness of the weld bead can be lower than in the absence of titanium. Thus, for example hardness differences from Rockwell C-27 to Rockwell B-95 can occur.

It is particularly significant to provide a higher alloy content in the weld beads in the dome portion where three weld beads intersect in a Y at the axis of the bit. Such a Y-shaped intersection of weld beads is subject to high stress levels, and enhanced metallurgical properties are important.

Another benefit of titanium in the weld bead adjacent the crown arises from its ability to stabilize carbon by formation of titanium carbide. Parts of the bit segments are carburized before assembly, but the region to be welded is protected from carburizing by conventional "stop-off" materials which inhibit diffusion of carbon into the steel segment. Such stop-off materials are applied to the surface as a slurry or electroplate, and pinhole imperfections may occur, leading to carburized spots in regions to be welded. Such high-carbon regions in a weld bead can be deleteriously brittle. Accidental carbon leakage can be rectified by presence of titanium or other strong carbide forming material in the welding shims. The titanium carbide is present as a separate phase in small particles, and does not significantly diminish ductility. Other carbide-forming metals having a stronger affinity for carbon than does iron can be included in the shim.

Other alloying metals can also be used in the shims. Suitable materials can include titanium alloys, zirconium, columbium, molybdenum, nickel, alloys of such metals, nickel-chromium stainless steels such as type 310, and iron alloys including titanium, zirconium, columbium, molybdenum and/or nickel. Iron can be used for diluting alloy content and decreasing hardenability. Cobalt can provide dilution although it is not a ferrite strengthener. Some other metals can be present in limited quantities which contribute to the desired properties of the weld bead and can make desirable additions. Thus, for example, the titanium allow Ti-6A1-4V can be employed, the aluminum serving to deoxidize the grain refine the weld bead and vanadium contributing strength.

Typical materials for forming the segments of a rock bit include AISI type 8720 steel or AISI type 4815 steel. Other materials which alloy with such steel for enhancing ductility and/or toughness and increasing fatigue resistance of the weld bead will be apparent to those skilled in metallurgical arts.

The shims provided in the dome portion of the rock bit provides some divergence between the faying surfaces of the segments. It is believed that the presence of the shim helps minimize residual stresses due to weld metal shrinkage. When the third weld is made in a typical three-cone rock bit, the other two welds are rigid and shrinkage can leave large residual tensile stresses giving a tendency toward cracking. The shim in the third weld is particularly helpful in avoiding such a problem.

Warpage of an elongated weld joint can occur unless special precautions are taken. Thus, for example, when two pieces are welded edge-to-edge, weld metal shrinkage during progression along the weld joint can tighten the joint to cause warpage nearer the end of the weld. A slight divergence along the seam to be welded can compensate for this effect. The shim in the crown or dome where the segment welds end provides divergence which is believed to relieve stresses in the weld joint and minimize tendencies to crack. Such stress relief is particularly helpful where the three weld beads intersect.

In a three-cone rock bit, the third or last weld to be made has the greatest effect on residual stress. It has been found that by providing a dome-portion shim which also extends at least part way along the faying surfaces toward the shank of the bit, significant improvements in welding can be achieved. The use of three titanium shims in the welds significantly decreased the requirement for reworking electron-beam-welded bits as compared with electron-beam-welded bits without shims. Use of an L-shaped shim in the third or final weld to be made caused a further significant decrease in the requirements for reworking.

After a rock bit is welded, it is inspected and any cracks which could cause leakage from the interior of the bit are reworked by welding to close the crack. Such reworking is costly and time consuming.

About 200 rock bits were made by electon-beam welding three segments together as described above, but without any shims between the faying surfaces of adjacent segments. Over three-fourths of these bits needed some reworking of the welds.

Three titanium shims of the type illustrated in FIG. 3 were used in the welds in the dome portion of about 2000 rock bits. The reworking requirement decreased significantly to about 12% of the bits.

Thereafter two straight shims as illustrated in FIG. 3 were used in two of the three welds. An L-shaped shim was used in the third and final weld in lieu of the straight shim on almost 600 bits. The bits requiring reworking dropped to less than 2%. It is believed that the need for this residual reworking is due primarily to other factors, such as fit between the segments, improper indexing, errors in beam power or position, or the like.

The L-shaped shim provides filler metal in the portion of the third or final weld extending approximately to the shoulder adjacent the pin joint of the bit. The spacing provided by this shim, and the extra metal and enhancement of metallurgical properties of the weld bead in this region contribute to the decrease in reworking.

Electron-beam welding can cause some loss of material from the weld bead, particularly when the beam intersects the surface of the part being welded at a low angle. The lip 36 (FIG. 3) on the shim helps compensate for such possible loss of metal by providing extra material at the surface most subject to such loss. The lip also helps in positioning the shim before welding. If convenient, other enlarged portions such as a bead along one edge of the shim can be used to help in positioning the shim and providing extra metal at the edge of the mating faces of the weld.

The shim should be limited to about 0.010 inch thick. With thicker shims there is a greater possibility of the electron beam penetrating too deeply and causing pinhole leaks through the weld bead. Such a pinhole can lead to a washout of the type mentioned above with respect to cracks in the dome. The weld bead in electron-beam welding is only about $\frac{1}{8}$ inch wide and thicker shims can provide too much alloying metal for good weld-bead properties.

Generally it is preferred that the shim have a thickness in the range of from about 0.003 to about 0.007 inch. Such thickness provides adequate alloying metal for enhancing weldbead properties, and adequate spacing for stress relief without over dilution of the base metal or significant risk of pinhole leaks. Preferably, the width of the shim is substantially equal to the anticipated depth of penetration of the weld bead to assure a higher alloy content throughout the dome weld as compared with the steel of the segments.

When the rock bit body is completed by welding the three subassemblies together, it has a threaded shank portion at one end for connection to a drill string and three legs depending from the other end. The cutter cones are mounted on the lower ends of the legs. The rock bit has three weld beads spaced 120° apart extending along the hollow shank portion. Except for part of the third or final weld which is made, the shank portions of these weld beads have substantially the same composition as the steel used in forming the bit segments. The weld beads continue into the dome portion of the bit body to the Y-shaped intersection in the center. Each weld bead in the dome portion of the rock bit has a higher alloy content than the steel of the bit body due to melting of the shim. This weld bead with a different alloy content has enhanced metallurgical properties for minimizing any tendency toward cracking in the stressed portion of the rock bit body. The weld beads on the shank portion of the rock bit body are not subjected to the same types of stresses as those in the dome portion, and control of metallurgical properties of the weld bead is not as critical.

FIGS. 6 and 7 illustrate in side and end views, respectively, a two-cone rock bit 50 having parts of the body electron-beam welded together. This arrangement indicates the versatility of electron-beam welding technique described herein.

In two-cone bit 50, a unitary steel body 51 is forged and provided with a pin joint 52 at its shank end. Two cutter cones 53 having tungsten-carbide inserts 54 are mounted on the lower or downhole end of the bit. Each cone 53 is mounted on a leg 56 which is made as a separate part and welded into a mating pocket in bit body 51.

A mud jet orifice 57 is provided on the axis of the bit body. Additional mud jet orifices 58 are provided nearer the gage or periphery of the bit for directing drilling fluid toward the bottom of the hole being drilled in a region between cutter cones 53. Each of these outboard drilling-mud orifices 58 is in a separate steel insert 59 fitted into a mating pocket in bit body 51.

Inserts 59 and cutter mounting legs 56 are electron-beam welded to bit body 51. Thus, for example, heavy lines 61 in FIG. 7 show the locus of the weld beads. A titanium shim is advantageously placed between the faying surfaces of such a leg or insert and the bit body for enhancing the metallurgical properties of the weld bead, providing filler metal, and for spacing the faying surfaces apart for minimizing residual stresses. Such a shim is advantageously employed in the last portion of the weld to be made or can be included throughout the weld bead.

In the first embodiment described above, three shims are used in the three interfaces of a typical three-cone rock bit. In this embodiment, an alternative arrangement is to employ two shims, one as illustrated in FIG. 5 and a second shim of twice the length as the shims 35 illustrated in FIG. 3. The second shim has a central 60-degree bend to form a shallow "V" with 120-degree separation of the legs of the "V".

The angled or V-shaped shim fits into two interfaces, and the L-shaped shim fits between the other two mating faces of bit legs to form the third weld. The shims are readily formed as separate sheets of metal. However, a plated, flame sprayed or sputtered layer can be applied to one or both of the faying surfaces to perform as described herein. Wire or a screen can be used in some circumstances. Tapered shims can be useful in long welds. Other suitable shims can be employed in other configurations of rock bits. The process has been described in terms of electron-beam welding, but other energy beam techniques such as a laser having deep weld penetration can also be suitable.

Because of variations of this nature, it will be understood that this invention may be practiced otherwise than as specifically described.

What is claimed is:

1. A three-cone rock bit comprising:
   a steel rock bit body having a hollow, generally cylindrical shank portion at one end;
   means on the shank portion for connection of the rock bit to a drill string;
   three depending legs at the other end of the bit body;
   a rock-boring cutter cone mounted on each leg;
   a dome portion of the bit body between the shank portion and legs, the dome portion forming a web transverse to the axis of the rock bit between the hollow shank portion and the exterior of the rock bit;
   a plurality of weld beads along the shank portion of the bit body in each of three locations spaced 120° apart around the shank portion, at least some of such weld beads having a composition substantially the same as the composition of the steel of the bit body; and
   a weld bead in each of three sectors in the dome portion of the bit body, the three weld beads meeting in a Y-shaped intersection on the axis of the rock bit and extending generally radially therefrom, each of said weld beads being a continuation of a weld bead on the shank portion and having a different alloy content than the steel of the bit body.

2. A rock bit as recited in claim 1 wherein such a weld bead in the dome portion of the bit body has a higher titanium content than the steel of the bit body.

3. A rock bit as recited in claim 1 wherein such a weld bead in the dome portion of the bit body has a higher content of a carbide former than the steel of the bit body, the carbide former being a metal having a stronger affinity for carbon than does iron.

4. A rock bit as recited in claim 1 wherein at least part of one of the weld beads along the shank portion has a different alloy content than the steel of the bit body.

5. A rock bit as recited in claim 1 wherein such a weld bead in the dome portion of the bit body has a higher content of metal selected from the group consisting of titanium, zirconium, columbium, molybdenum and nickel than the steel of the bit body.

6. A rock bit body as recited in claim 5 wherein the weld beads are characterized by a depth of penetration much larger than the total width of the weld bead and heat affected zone.

* * * * *